(12) United States Patent
Jung et al.

(10) Patent No.: US 12,294,110 B2
(45) Date of Patent: May 6, 2025

(54) BATTERY MODULE AND BATTERY PACK INCLUDING THE SAME

(71) Applicant: LG ENERGY SOLUTION, LTD., Seoul (KR)

(72) Inventors: Hyemi Jung, Daejeon (KR); Kwangmo Kim, Daejeon (KR); Junyeob Seong, Daejeon (KR); Seok Eun Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 16 days.

(21) Appl. No.: 17/689,361

(22) Filed: Mar. 8, 2022

(65) Prior Publication Data
US 2022/0294075 A1    Sep. 15, 2022

(30) Foreign Application Priority Data
Mar. 9, 2021    (KR) ........................ 10-2021-0030704

(51) Int. Cl.
*H01M 50/383* (2021.01)
*H01M 50/211* (2021.01)
*H01M 50/271* (2021.01)
*H01M 50/296* (2021.01)
*H01M 50/30* (2021.01)

(52) U.S. Cl.
CPC ....... *H01M 50/383* (2021.01); *H01M 50/211* (2021.01); *H01M 50/271* (2021.01); *H01M 50/296* (2021.01); *H01M 50/394* (2021.01)

(58) Field of Classification Search
CPC ............ H01M 50/383; H01M 50/296; H01M 50/394; H01M 50/211; H01M 50/271
See application file for complete search history.

(56) References Cited

U.S. PATENT DOCUMENTS

| | | | |
|---|---|---|---|
| 2012/0094155 A1 | 4/2012 | Lim | |
| 2014/0287286 A1 | 9/2014 | Miyawaki et al. | |
| 2016/0233465 A1* | 8/2016 | Lee | ...................... H01M 10/625 |
| 2018/0337376 A1* | 11/2018 | Jin | ...................... H01M 10/482 |

FOREIGN PATENT DOCUMENTS

| | | | | |
|---|---|---|---|---|
| CN | 209298186 U | * | 8/2019 | |
| EP | 3460870 A1 | * | 3/2019 | ............... A62C 3/16 |
| JP | 6390062 B2 | | 9/2018 | |
| KR | 10-1292988 B1 | | 8/2013 | |

(Continued)

OTHER PUBLICATIONS

Machine translation of WO2019177275A1, accessed May 2023 (Year: 2023).*

(Continued)

*Primary Examiner* — Milton I Cano
*Assistant Examiner* — Albert Michael Hilton
(74) *Attorney, Agent, or Firm* — Birch, Stewart, Kolasch & Birch, LLP

(57) ABSTRACT

A battery module includes a battery cell stack in which a plurality of battery cells is stacked; a module frame configured to accommodate the battery cell stack and including a plurality of venting holes in at least one surface; end plates disposed at both sides of the battery cell stack; and an anti-inflammatory cover configured to cover the plurality of venting holes.

20 Claims, 10 Drawing Sheets

(56) References Cited

FOREIGN PATENT DOCUMENTS

| KR | 10-2014-0114764 A | 9/2014 | |
|----|-------------------|--------|---|
| KR | 10-2017-0014309 A | 2/2017 | |
| KR | 10-2017-0137997 A | 12/2017 | |
| KR | 10-2072098 B1 | 1/2020 | |
| WO | WO-2019177275 A1 * | 9/2019 | ............ H01M 10/42 |

OTHER PUBLICATIONS

Machine translation of KR20170014309, accessed May 2023 (Year: 2023).*

M. A. Industries: Frequently Asked Questions [online] M. A. Industries, 2017 [retrieved on May 26, 2023]. Retrieved from the Internet: <URL: https://porousplastics.com/faqs.htm#:~:text=What%20is%20the%20pore%20size,30%20micron%20to%20150%20micron.>) . (Year: 2017).*

Machine translation of CN-209298186-U (Year: 2023).*

* cited by examiner

Conventional Art

Conventional Art

BATTERY MODULE AND BATTERY PACK INCLUDING THE SAME

CROSS-REFERENCE TO RELATED APPLICATION

This application claims priority to and the benefit of Korean Patent Application No. 10-2021-0030704 filed in the Korean Intellectual Property Office on Mar. 9, 2021, the entire contents of which are incorporated herein by reference.

BACKGROUND OF THE INVENTION

(a) Field of the Invention

The present invention relates to a battery module and a battery pack including the same, and more particularly, to a battery module with enhanced safety and a battery pack including the same.

(b) Description of the Related Art

In modern society, as the use of portable devices, such as mobile phones, notebook computers, camcorders, and digital cameras, has become commonplace, the development of technologies related to the mobile devices is become active. Further, a rechargeable secondary battery is a measure to solve the air pollution of existing gasoline vehicles that use fossil fuels, and is used as a power source of an Electric Vehicle (EV), a Hybrid Electric Vehicle (HEV), a Plug-in Hybrid Electric Vehicle (P-HEV), and the like, so that the need for development of the secondary battery is also increasing.

Currently commercialized secondary batteries include nickel cadmium batteries, nickel hydride batteries, nickel zinc batteries, lithium secondary batteries, and the like, and among them, the lithium secondary battery is in the spotlight for its advantages in that charge and discharge are free because a memory effect is little, a self-discharge rate is very low, and energy density is very high, compared to the nickel-based secondary battery.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate, to which the positive electrode active material and the negative electrode active material are applied, respectively, are disposed with a separator interposed therebetween, and a battery case, that seals and accommodates the electrode assembly together with an electrolyte.

In general, the lithium secondary battery may be classified into a can-type secondary battery in which the electrode assembly is embedded in a metal can, and a pouch-type secondary battery in which the electrode assembly is embedded in a pouch of an aluminum laminate sheet, according to a shape of the exterior material.

In the case of the secondary batteries used in small devices, two or three battery cells are disposed, but in the case of the secondary batteries used in middle and large devices, such as automobiles, a battery module in which the plurality of battery cells is electrically connected is used. In the battery module, the plurality of battery cells is connected to each other in series or in parallel to form a battery cell stack, so that capacity and output are improved. One or more battery modules may be mounted together with various control and protection systems, such as a Battery Disconnect Unit (BDU), a Battery Management System (BMS) and a cooling system, to form a battery pack.

FIG. 1 is a perspective view illustrating a battery module in the related art.

Referring to FIG. 1, a battery module 10 in the related art may be manufactured by accommodating a battery cell stack (not illustrated) in a module frame 20, and then bonding an end plate 40 to an opened portion of the module frame 20. In this case, a connection opening 41H through which a part of a terminal bus bar is exposed and a module connector opening 42H through which a part of a module connector is exposed may be formed in the end plate 40. The connection opening 41H is for guiding a High Voltage (HV) connection of the battery module 10, and the terminal bus bar exposed through the connection opening 41H may be connected to another battery module or a Battery Disconnect Unit (BDU). The module connector opening 42H is for guiding a Low Voltage (LV) connection of the battery module 10, and the module connector exposed through the module connector opening 42H is connected with a Battery Management System (BMS) to transmit voltage information, temperature information, and the like of a battery cell.

FIG. 2 is a diagram illustrating a state when the battery module is ignited in the battery pack in the related art in which the battery module of FIG. 1 is mounted. FIG. 3 is a cross-sectional view taken along line I-I' of FIG. 2, and illustrates the ignition affecting an adjacent battery module when the battery module in the related art is ignited.

Referring to FIGS. 1 to 3, the battery module 10 in the related art includes a battery cell stack in which the plurality of battery cells 11 is stacked, the module frame 20 accommodating the battery cell stack, and the end plates 40 formed on front and rear surfaces of the battery cell stack.

When physical, thermal, and electric damage including overcharging occurs to the battery cell, an internal pressure of the battery cell 11 increases and exceeds a fusion strength limited value of the battery cell 11, high-temperature heat, gas, and flame generated in the battery cell 11 may be discharged to the outside of the battery cell 11.

In this case, the high-temperature heat, gas, and flame may be discharged through the openings 41H and 42H formed in the end plate 40, and in a battery pack structure in which the plurality of battery modules 10 is disposed so that the end plates 40 face each other, the high-temperature heat, gas, and flame ejected from the battery module 10 may affect the neighboring battery module 10. Accordingly, the terminal bus bar and the like formed in the end plate 40 of the adjacent battery module may be damaged, and high-temperature heat, gas, and flame may enter the interior of the battery module 10 through the opening formed in the end plate 40 of the neighboring battery module 10 to damage other electrical components including the plurality of battery cells 11. In addition, this leads to heat propagation of the neighboring battery modules 10, resulting in a chain ignition within the battery pack.

Accordingly, when thermal propagation occurs in the battery module, it is necessary to develop a technology capable of controlling a high-temperature flame so as to minimize the influence on the neighboring battery module.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a battery module which is capable of quickly discharging a large amount of gas and preventing scattering current-carrying materials and the like emitted from a cell in which an ignition phenomenon occurs from being transferred to an adjacent module or damaging a component at the same time when the ignition phenomenon occurs within the battery module, and a battery pack including the same.

However, the problem to be solved in the exemplary embodiments of the present invention is not limited to the foregoing problem, and may be variously extended in the scope of the technical spirit included in the present invention.

An exemplary embodiment of the present invention provides a battery module including: a battery cell stack in which a plurality of battery cells is stacked; a module frame configured to accommodate the battery cell stack and including a plurality of venting holes in at least one surface; an end plate disposed at a side of the battery cell stack; and an anti-inflammatory cover configured to cover the plurality of venting holes.

The plurality of venting holes may be formed on an upper surface of the module frame, and the anti-inflammatory cover may include an anti-inflammatory part corresponding to the plurality of venting holes, and a bus bar cover part corresponding to an upper portion of the end plate.

The anti-inflammatory part may include a micro-perforated structure.

The anti-inflammatory part may have a mesh structure.

The battery module may further include a terminal bus bar configured to connect the battery cell stack and an external device, in which the end plate may include a connection opening for exposing the terminal bus bar, and the bus bar cover part may cover the connection opening.

The bus bar cover part may include a stepped portion for coupling an external bus bar at a location corresponding to the terminal bus bar.

The bus bar cover part may further include an external bus bar cover formed to cover the external bus bar so as to correspond to the stepped portion.

The external bus bar cover may be rotatably coupled to the bus bar cover part by a hinge.

The end plate may further include a first through-hole to which a connection member for mounting the battery module to a battery pack is inserted, and the anti-inflammatory cover may further include a second through-hole corresponding to the first through-hole.

Another exemplary embodiment of the present invention provides a battery pack including the foregoing battery module.

According to the exemplary embodiments of the present invention, when an ignition phenomenon occurs within a battery module, it is possible to rapidly discharge high-temperature gas to the outside and suppress high-temperature flame from being discharged. In addition, it is possible to prevent the fragments that may be scattered from the cell in which the ignition phenomenon occurs from transferring to an adjacent module or damaging components.

The effects of the present invention are not limited to the foregoing effects, and other non-mentioned effects will be clearly understood by those skilled in the art from the description below.

DETAILED DESCRIPTION OF THE EMBODIMENTS

Figure 1:
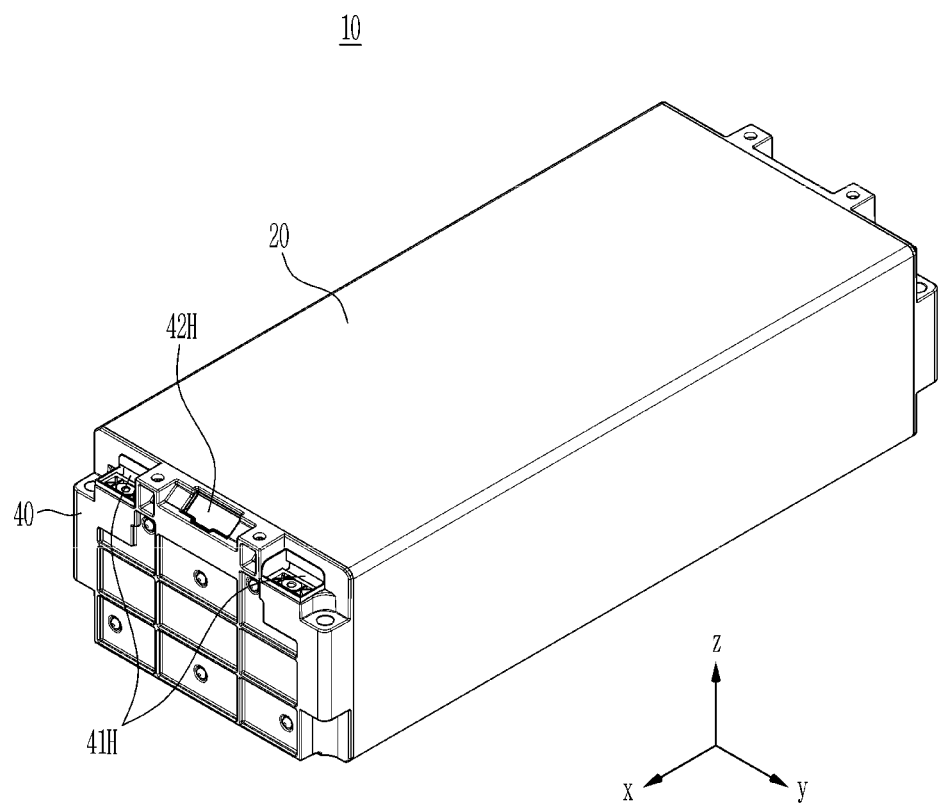
FIG. 1 is a perspective view illustrating a battery module in the related art.
Figure 2:
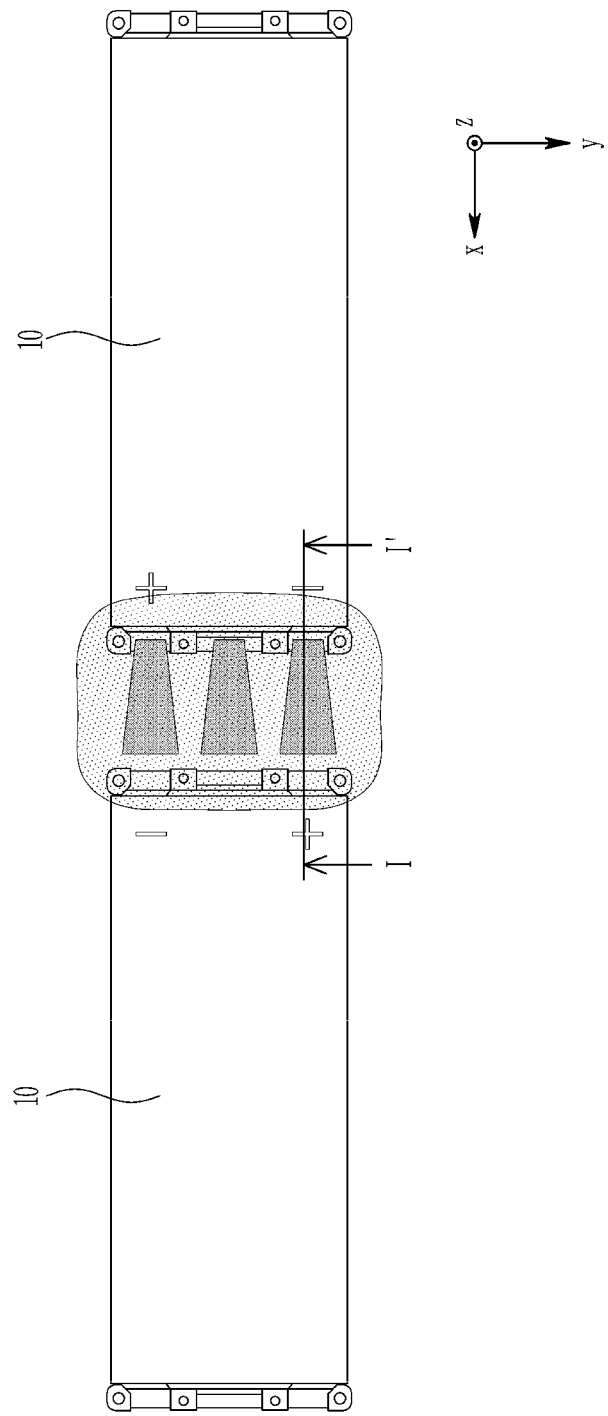
FIG. 2 is a diagram illustrating a state when the battery module is ignited in the battery pack in the related art in which the battery module of FIG. 1 is mounted.

In the following detailed description, only certain exemplary embodiments of the present invention have been shown and described, simply by way of illustration. However, the present invention can be variously implemented and is not limited to the following embodiments.

Accordingly, the drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present invention is not limited thereto. In the drawings, the thickness of layers, films, panels, regions, etc., are exaggerated for clarity. In the drawings, for understanding and ease of description, the thickness of some layers and areas is exaggerated.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is "on" a reference portion, the element is located above or below the reference portion, and it does not necessarily mean that the element is located "on" in a direction opposite to gravity.

In addition, unless explicitly described to the contrary, the word "comprise", and variations such as "comprises" or "comprising", will be understood to imply the inclusion of stated elements but not the exclusion of any other elements.

Further, in the entire specification, when it is referred to as "on a plane", it means when a target part is viewed from above, and when it is referred to as "on a cross-section", it means when the cross-section obtained by cutting a target part vertically is viewed from the side.

Figure 4:
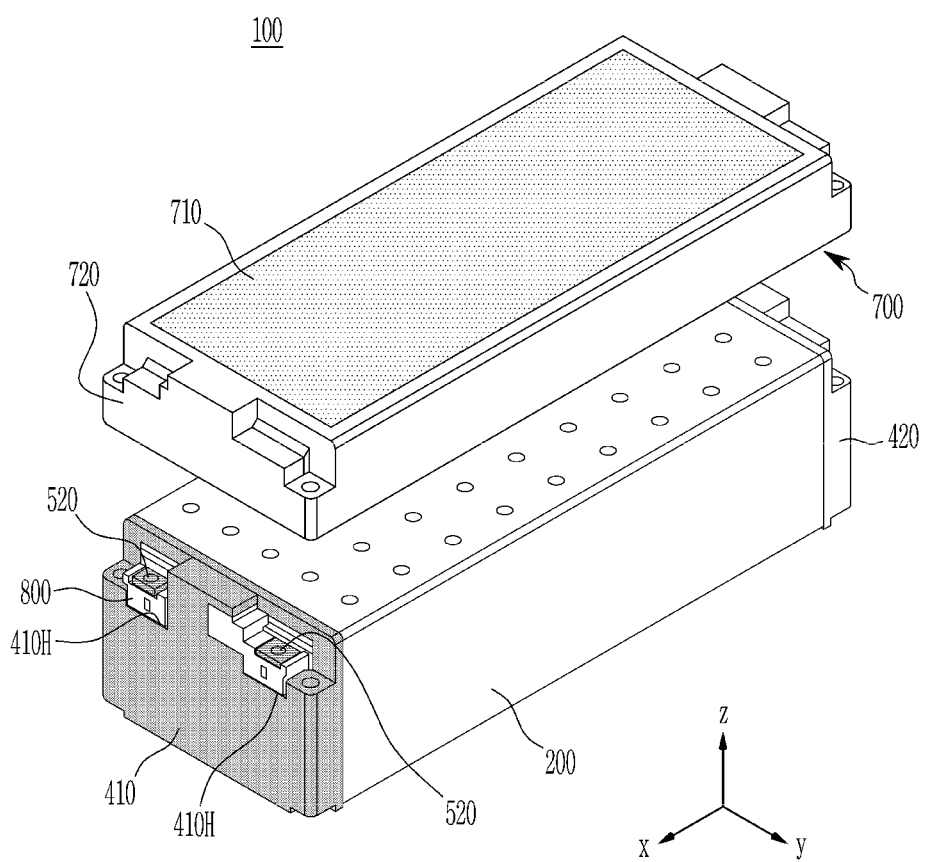
FIG. 4 is a perspective view illustrating a battery module according to an exemplary embodiment of the present invention.
Figure 5:
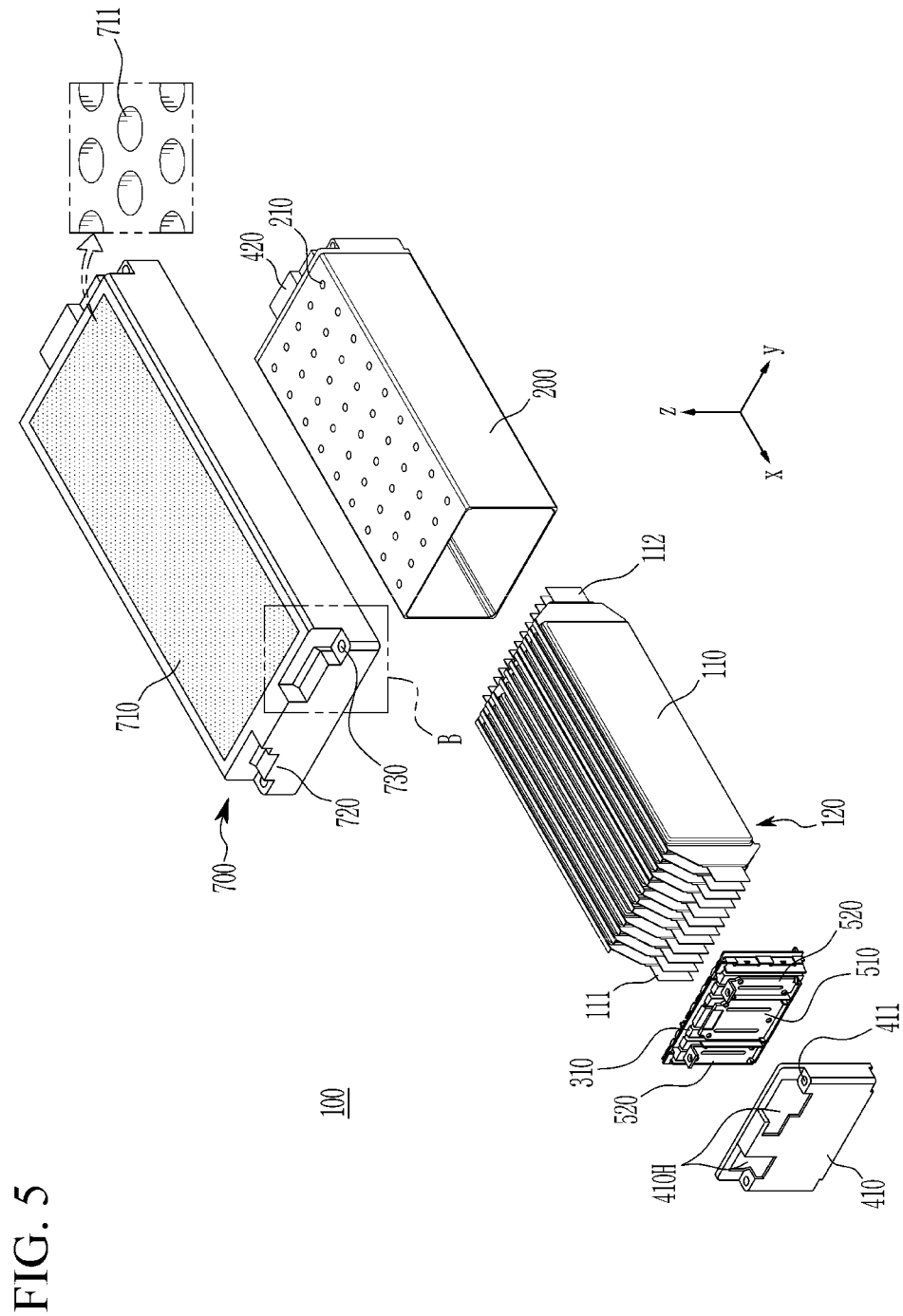
FIG. 5 is an exploded perspective view of the battery module of FIG. 4.
Figure 6:
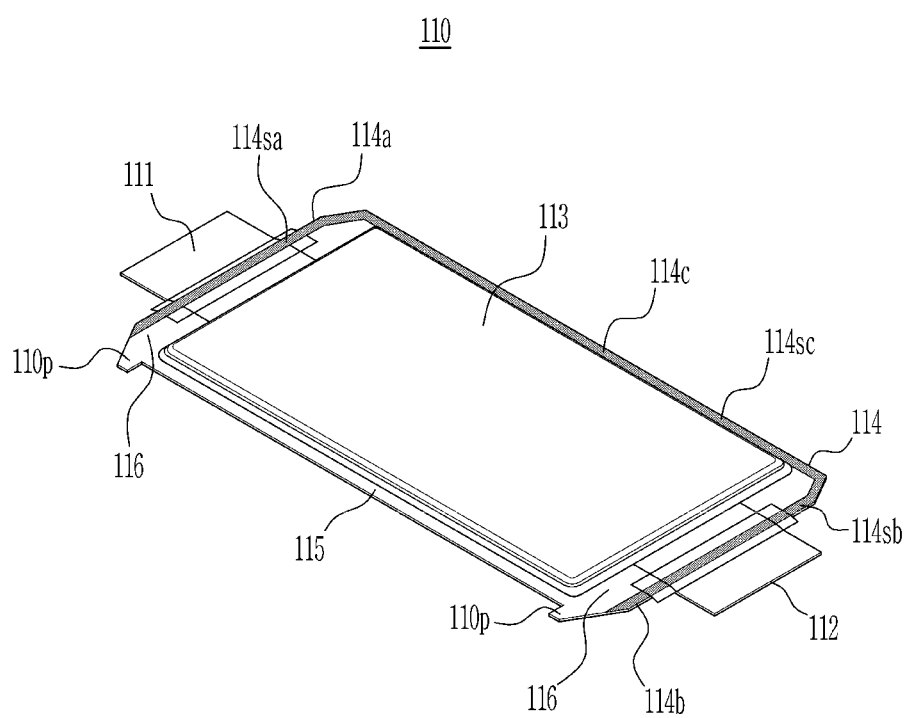
FIG. 6 is a perspective view illustrating a battery cell included in the battery module of FIG. 5.
Figure 7:
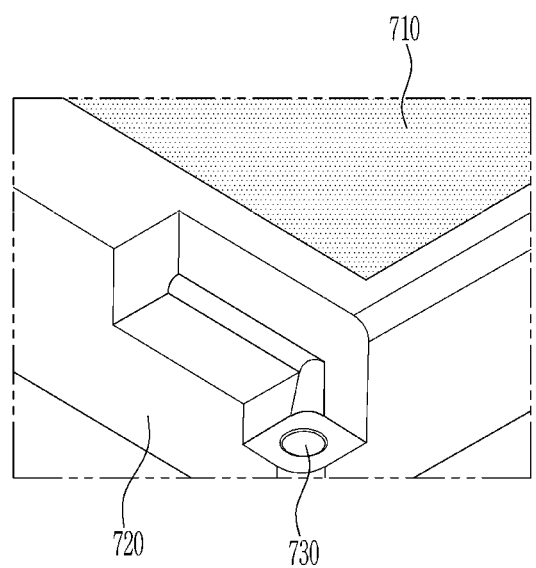
FIG. 7 is an enlarged view of part B of FIG. 5.

FIG. 4 is a perspective view illustrating a battery module according to an exemplary embodiment of the present invention. FIG. 5 is an exploded perspective view of the battery module of FIG. 4. FIG. 6 is a perspective view illustrating a battery cell included in the battery module of FIG. 5. FIG. 7 is an enlarged view of part B of FIG. 5.

Referring to FIGS. 4 to 7, a battery module 100 according to the exemplary embodiment of the present invention includes: a battery cell stack 120 in which the plurality of battery cells 110 is stacked, a module frame 200 accommodating the battery cell stack 120 and including a plurality of venting holes 210; end plates 410 and 420 disposed at both sides of the battery cell stack 120, and an anti-inflammatory cover 700 covering the plurality of venting holes 210.

First, referring to FIG. 6, the battery cell 110 may be a pouch-type battery cell. For example, the battery cell 110 according to the present exemplary embodiment has a structure in which two electrode leads 111 and 112 face each other and protrude from one end 114a and the other end 114b of a cell main body 113, respectively. More particularly, the electrode leads 111 and 112 are connected with an electrode assembly (not illustrated) and protrude from the electrode assembly (not illustrated) to the outside of the battery cell 110.

In the meantime, the battery cell 110 may be manufactured by bonding both ends 114a and 114b of the cell case 114 and one lateral part 114c connecting both ends 114a and 114b in the state where the electrode assembly (not illustrated) is accommodated in the cell case 114. That is, the battery cell 110 according to the present exemplary embodiment has a total of three sealing parts 114sa, 114sb, and 114sc, and the sealing parts 114sa, 114sb, and 114sc have a structure that is sealed by a method, such as thermal fusion, and the other lateral part may be formed as a connection part 115. The cell case 114 may be formed of a laminate sheet including a resin layer and a metal layer. Further, the connection part 115 may elongate along one border of the battery cell 110, and a protruding portion 110p of the battery cell 110 called a bat-ear may be formed at the end of the connection part 115. Further, the cell case 114 is sealed with the protruding electrode leads 111 and 112 interposed therebetween, so that a terrace portion 116 may be formed between the electrode leads 111 and 112 and the cell main body 113. That is, the battery cell 110 includes the terrace portion 116 extending from the cell case 114 in the direction in which the electrode leads 111 and 112 protrude.

The battery cell 110 may be configured in plural, and the plurality of battery cells 110 may be stacked to be electrically connected to each other to form the battery cell stack 120. Referring to FIG. 5, the battery cells 110 may be stacked in a y-axis direction to form the battery cell stack 120. A first bus bar frame 310 may be positioned on one surface of the battery cell stack 120 in the direction (x-axis direction) in which the electrode lead 111 protrudes. Although not illustrated in particular, a second bus bar frame may be positioned on the other surface of the battery cell stack 120 in the direction (-x axis direction) in which the electrode lead 112 protrudes. The battery cell stack 120 and the first bus bar frame 310 may be accommodated in the module frame 200 together. The module frame 200 may protect the battery cell stack 120 accommodated in the module frame 200 and the electric component connected with the battery cell stack 120 from external physical impact. The module frame 200 may be the module frame 200 in the form of a metal plate in which an upper surface, a lower surface, and both lateral surfaces are integrated as illustrated in FIG. 5. That is, when the module frame 200 is in the form of a quadrangular tube, a space in which the battery cell stack 120 is accommodable is formed inside the module frame 200, and the end plates 410 and 420 are coupled to both ends of the quadrangular tube form. However, the present invention is not limited thereto, and various forms of module frame 200 are applicable. As a possible modified example, the module frame 200 in the form in which the upper cover and a U-shaped frame are combined, or the form in which the lower plate and the U-shaped frame in the reverse direction are combined is also possible, but the present invention is not particularly limited.

The plurality of venting holes 210 may be formed in at least one surface of the module frame 200. For example, as illustrated in FIGS. 4 and 5, the plurality of venting holes 210 may be formed in the upper surface of the module frame 200, that is the upper surface in the z-axis direction. The plurality of venting holes 210 is formed, thereby provide a discharge path of heat, gas, or flame generated inside the battery module 100. Accordingly, it is possible to prevent heat, gas, or flame generated inside the battery module 100 from being accumulated and exploded. The plurality of venting holes 210 may also be uniformly formed on the entire upper surface of the module frame 200 at a regular predetermined interval, or may also be formed biased toward any one portion to induce discharge in a predetermined direction.

In the meantime, the module frame 200 may be opened in the direction (x-axis direction and -x-axis direction) in which the electrode leads 111 and 112 protrude, and the end plates 410 and 420 may be positioned at both opened sides of the module frame 200, respectively. The two end plates 410 and 420 may be referred to as a first end plate 410 and a second end plate 420, respectively. The first end plate 410 may be joined to the module frame 200 while covering the first bus bar frame 310, and the second end plate 420 may be joined to the module frame 200 while covering the second bus bar frame (not illustrated). That is, the first bus bar frame 310 may be positioned between the first end plate 410 and the battery cell stack 120, and the second bus bar frame (not illustrated) may be positioned between the second end plate 420 and the battery cell stack 120

Further, an insulating cover 800 (see FIG. 4) for electric insulation may be positioned between the first end plate 410 and the first bus bar frame 310.

The first end plate 410 and the second end plate 420 are positioned to cover the one surface and the other surface of the battery cell stack 120, respectively. The first end plate 410 and the second end plate 420 may protect the first bus bar frame 310 and various electric components connected with the first bus bar frame 3100 from external impact, and to this end, the first end plate 410 and the second end plate 420 need to have predetermined strength and may include a metal, such as aluminum. Further, each of the first end plate 410 and the second end plate 420 may be jointed to an edge corresponding to the module frame 200 by a method, such as welding. Further, when the battery module 100 is mounted to the battery pack frame and the like so as to configure the battery pack, a first venting hole 411 may be formed in edges of the first end plate 410 and the second end plate 420 so that a connection member for mounting is insertable. However, the method of fixing the battery module 100 to the battery pack is not limited thereto, and the battery module may be mounted by various methods.

The first bus bar frame 310 is positioned on one surface of the battery cell stack 120 to cover the battery cell stack 120 and guide a connection between the battery cell stack 120 and an external device at the same time. In particular, at least one of the bus bar, the terminal bus bar, and the module connector may be mounted to the first bus bar frame 310. In particular, at least one of the bus bar, the terminal bus bar, and the module connector may be mounted onto a surface of the first bus bar frame 310 opposite to the surface facing the battery cell stack. For example, FIG. 5 illustrates the state where the bus bar 510 and the terminal bus bar 520 are mounted to the first bus bar frame 310.

The electrode lead 111 of the battery cell 110 is bent after passing through a slit formed in the first bus bar frame 310 to be jointed to the bus bar 510 or the terminal bus bar 520. The battery cells 110 configuring the battery cell stack 120 may be connected in series or in parallel by the bus bar 510 or the terminal bus bar 520. Further, the external device or the circuit and the battery cells 110 may be electrically connected through the terminal bus bar 520 exposed to the outside of the battery module 100.

The first bus bar frame 310 may include an electrically insulative material. The first bus bar frame 310 limits the contact between the bus bar 510 or the terminal bus bar 520 and the battery cells 110, except for the portion in which the bus bar 510 or the terminal bus bar 520 is joined to the electrode lead 111, to prevent a short circuit.

In the meantime, as described above, the second bus bar frame may be positioned on the other surface of the battery cell stack 120, and at least one of the bus bar, the terminal bus bar, and the module connector may be mounted to the second bus bar frame. The electrode lead 112 may be joined to the bus bar.

An opening through which at least one of the terminal bus bar and the module connector is exposed may be formed in the first end plate 410 according to the present exemplary embodiment. The opening may be a connection opening or a module connector opening. For example, as illustrated in FIGS. 4 and 5, a connection opening 410H, through which the terminal bus bar 520 is exposed, may be formed in the first end plate 410. Compared to the bus bar 510, the terminal bus bar 520 further includes an upwardly protruding portion, and the upwardly protruding portion may be exposed to the outside of the battery module 100 through the connection opening 410H. The terminal bus bar 520 exposed through the connection opening 410H is connected with another battery module or a Battery Disconnect Unit (BDU) through an external bus bar and the like to form a High Voltage (HV) connection. Further, although not illustrated, a connection opening may be formed even in the second end plate 420, and the terminal bus bar or the module connector mounted to the bus bar frame, and the like may be connected with the external device through the connection opening.

In the meantime, the end plates 410 and 420 according to the present exemplary embodiment covers the front surface and the rear surface of the battery cell stack 120, and the module frame 200 covers the upper surface, the lower surface, and both lateral surfaces of the battery cell stack 120. Herein, the front surface means the surface of the battery cell stack 120 in the x-axis direction, and the rear surface means the surface of the battery cell stack 120 in the −x-axis direction. The upper surface means the surface of the battery cell stack 120 in the z-axis direction, the lower surface means the surface of the battery cell stack 120 in the −z-axis direction, and the both lateral surfaces mean the surfaces of the battery cell stack 120 in the y-axis and −y-axis directions. However, these are the surfaces indicated for convenience of description, and may vary depending on the location of the target object or the location of the observer. As described above, the front surface and the rear surface of the battery cell stack 120 may be the surfaces on which the protruding electrode leads 111 and 112 of the battery cell 110 are located.

According to the present exemplary embodiment, the battery module 100 includes the anti-inflammatory cover 700 covering the venting hole 210 of the module frame 200. In the present exemplary embodiment, the anti-inflammatory cover 700 is formed to cover the upper surface of the module frame 200.

The anti-inflammatory cover 700 may include an anti-inflammatory part 710 formed to correspond to the plurality of venting holes 210, that is, the upper surface of the module frame 200, and a bus bar cover part 720 formed on the upper portion of the end plate. The anti-inflammatory part 710 and the bus bar cover part 720 may be integrally formed by a press method and the like.

The anti-inflammatory part 710 may have the configuration in which the plurality of micro-holes is formed so as to rapidly discharge high-temperature gas discharged through the venting hole 210 to the outside and prevent high-temperature flame from being directly discharged. For example, as illustrated in FIG. 5, the anti-inflammatory part 710 may be formed to have a micro-perforated structure having the plurality of micro-holes 711. That is, the anti-inflammatory part 710 may have the structure in which the plurality of micro-holes 711 is formed in a metal sheet. The configuration serves as a sort of mesh screen to suppress flame from being discharged to the outside. Further, the micro-hole 710 having a micro size, not a simple through-hole, is formed, so that there may be an effect in that a heat transfer area of the module frame 200 increases. That is, it is possible to increase the amount of gas discharged, and decrease a temperature increase rate within the battery module 100 according to heat dissipation to the outside of the battery module 100.

In addition, in the present exemplary embodiment, the anti-inflammatory part 710 is not solely formed, but the anti-inflammatory parts 710 are formed so as to correspond to the venting holes 210 formed in the module frame 200, so that it is possible to prevent blockage of the anti-inflammatory part 710 by scattering materials and the like generated during thermal runaway, and further, the flame and heat discharge path is complexly set, thereby effectively blocking the intensity of the flame.

In the meantime, the bus bar cover part 720 integrally formed with the anti-inflammatory part 710 may be formed to cover the connection opening 410H which has been described above. That is, the connection openings 410H (in FIGS. 4 and 5, only the connection opening formed in the first end plate is illustrated, but the connection opening may be identically or similarly formed in the second end plate at the opposite side) through which the portion, for example, the terminal bus bar 520, which is capable of electrically connecting the internal battery cell stack 110 and the external device, is exposed to the outside, are formed in the first and second end plates 410 and 420, and the bus bar cover part 720 is formed to cover the connection opening 410H so as to correspond to the connection opening 410H. Therefore, the bus bar cover part 720 may cover and protect the terminal bus bar 520 and the like exposed through the connection opening 410H. Particularly, when high-temperature heat, gas, and flame are generated in the battery module 100 or a neighboring battery module, scattering products may be generated together, and by the bus bar cover part 720, it is possible to completely protect the component which is exposed to the outside of the end plates 410 and 420 and has damage possibility, and prevent the component from being damaged due to heat and scattering products. Further, in the present exemplary embodiment, the bus bar cover part 720 does not exist as a separate component, but is integrally formed with the anti-inflammatory part 710 in the anti-inflammatory cover 700, so that it is possible to prevent flame from being discharged to the outside and effectively protect the internal components at the same time by the simple structure.

Figure 3:
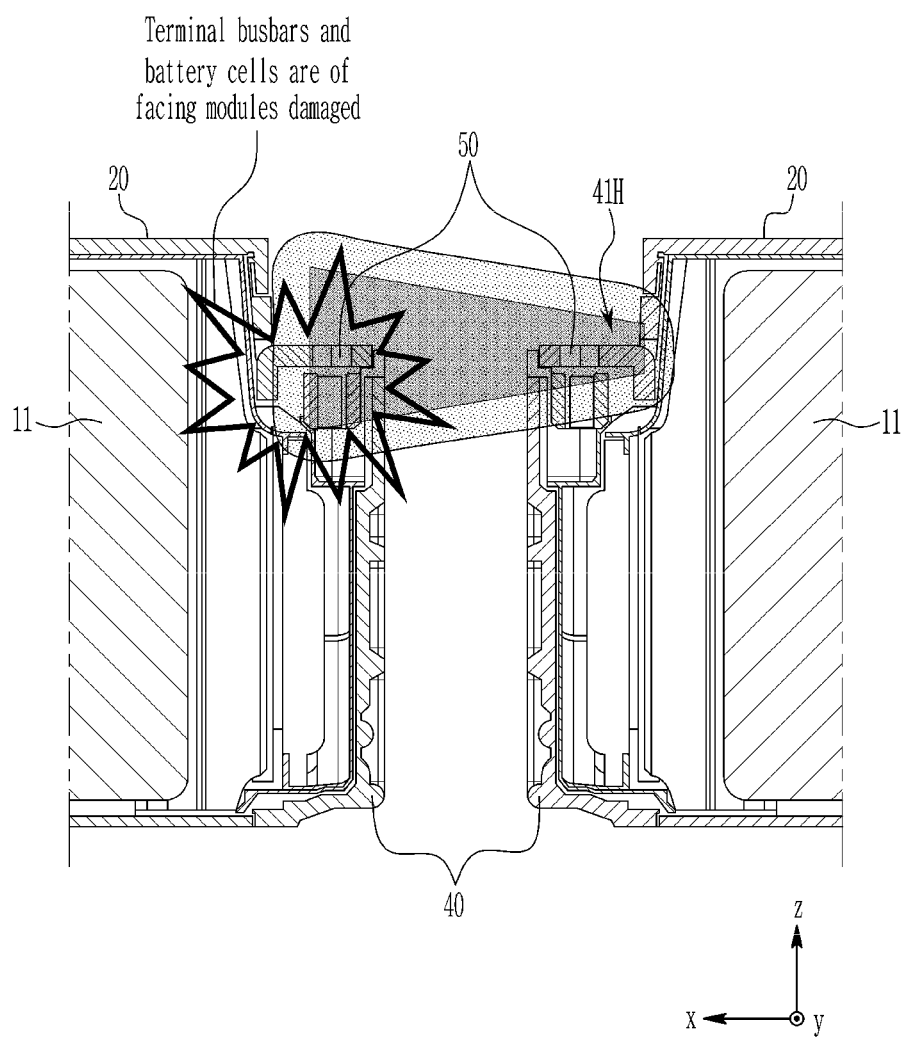
FIG. 3 is a cross-sectional view taken along line I-I' of FIG. 2.

In addition, as described with reference to FIG. 3, the structure in the related art has the problem in that high-temperature heat, gas, and flame enter into the battery module 10 through the opening formed in the end plate 40 of the neighboring battery module 10 to damage other electrical components including the plurality of battery cells 11, but in the present exemplary embodiment, it is possible to protect the internal electric components from heat, gas, and flame introduced from the outside by the configuration of the bus bar cover part 720, and even though high-temperature heat, gas, and flame are generated in the corresponding battery module 100, it is possible to prevent transfer and diffusion of the high-temperature heat, gas, and flame to a neighboring battery module, thereby blocking additional heat transfer.

In addition, the anti-inflammatory cover 700 may further include second through-holes 730 (see FIG. 7) existing at the locations corresponding to the first through-holes 411 formed in the first and second end plates 410 and 420. By this, the anti-inflammatory cover 700 may be simply fixed by the connection member (not illustrated). However, the configuration for fixing the anti-inflammatory cover 700 is not limited thereto, and may be fixed by various methods.

Next, an anti-inflammatory cover 700 according to a modified exemplary embodiment of the present invention will be described with reference to FIG. 8.

Figure 8:
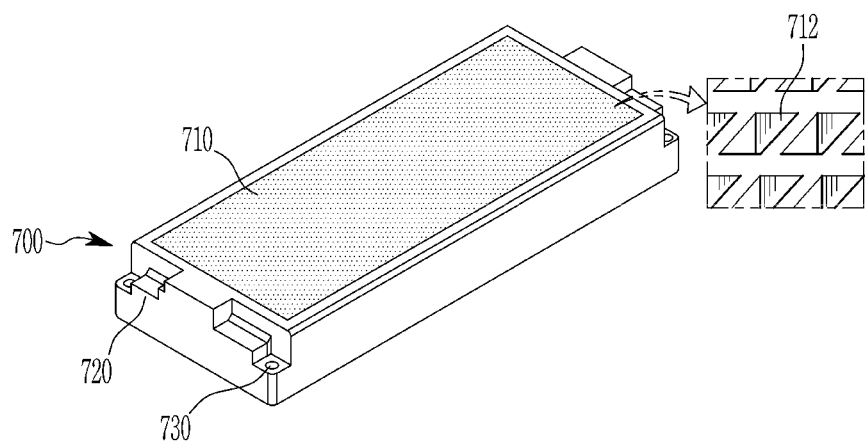
FIG. 8 is a perspective view illustrating an anti-inflammatory cover according to a modified exemplary embodiment of the present invention.

FIG. 8 is a perspective view illustrating an anti-inflammatory cover according to a modified exemplary embodiment of the present invention In the present exemplary embodiment, in the anti-inflammatory cover 700, the anti-inflammatory part 710 may have a mesh structure. That is, a micro-hole 712 having a quadrangular shape may be formed, so that the anti-inflammatory part 710 is formed in the mesh structure. However, the present exemplary embodiment is not limited thereto, and various forms of micro-holes may be formed.

Next, an anti-inflammatory cover 700 according to another exemplary embodiment of the present invention will be described with reference to FIGS. 9 and 10.

Figure 9:
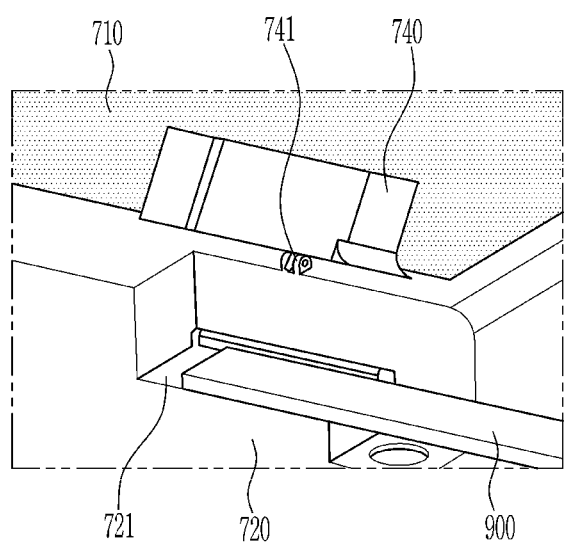
FIG. 9 is an enlarged view of part B of FIG. 5 according to another modified exemplary embodiment of the present invention
Figure 10:
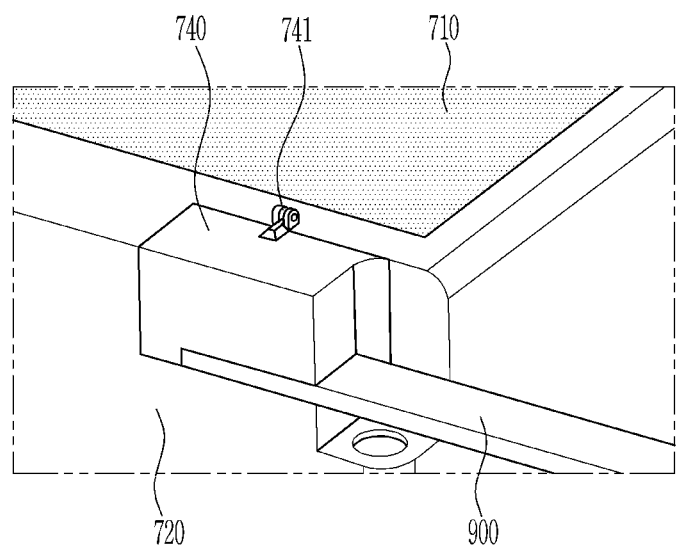
FIG. 10 is a diagram illustrating the state of placing an external bus bar cover in FIG. 9.

FIG. 9 is an enlarged view of part B of FIG. 5 according to another modified exemplary embodiment of the present invention FIG. 10 is a diagram illustrating the state of putting an external bus bar cover in FIG. 9.

As illustrated in FIGS. 9 and 10, in the present exemplary embodiment, a stepped portion 721 on which an external bus bar 900 is mountable is provided to the bus bar cover part 720, and an external bus bar cover 740 covering the external bus bar 900 disposed in the stepped portion 721 may be further included. The external bus bar cover 740 may be rotatably coupled to the bus bar cover part 720 by a hinge part 741. However, the present invention is not limited thereto, and the external bus bar cover 740 may be integrally formed with the bus bar cover part 720.

The external bus bar cover 740 covers the external bus bar 900 as illustrated in FIG. 10. Therefore, it is possible to protect the mounted external bus bar 900, and prevent damage due to high-temperature gas, flame, heat and scattering products generated in the battery module 100 or a neighboring battery module.

In the present exemplary embodiment, the terms indicating directions such as front, back, left, right, up, and down are used, but these terms are for convenience of description only, and may vary depending on the location of the target object or the position of the observer.

The foregoing one or more battery modules according to the present exemplary embodiment may be mounted together with various control and protecting systems, such as a Battery Management System (BMS), a Battery Disconnect Unit (BDU), and a cooling system, to form a battery pack.

The battery module or the battery pack is applicable to various devices. In particular, the battery module or the battery pack is applicable to transport means, such as an electric bicycle, an electric vehicle, and a hybrid vehicle, but is not limited thereto, and the battery module or the battery pack is applicable to various devices capable of using a secondary battery.

Although an exemplary embodiment of the present invention has been described in detail, the scope of the present invention is not limited by the embodiment. Various changes and modifications using the basic concept of the present invention defined in the accompanying claims by those skilled in the art shall be construed to belong to the scope of the present invention.

DESCRIPTION OF SYMBOLS

100: Battery module
200: Module frame
700: Anti-inflammatory cover
710: Anti-inflammatory part
720: Bus bar cover part

What is claimed is:

1. A battery module, comprising:
 a battery cell stack in which a plurality of battery cells is stacked;
 a module frame comprising sidewalls and a top wall, the top wall including a plurality of venting holes, the battery cell stack accommodated in the module frame;
 an end plate disposed at a side of the battery cell stack; and
 a cover configured to cover the plurality of venting holes, the cover having a top wall and sidewalls extending over the sidewalls of the module frame,
 wherein the cover has a plurality of holes.

2. The battery module of claim 1,
 wherein the cover includes a first part corresponding to the plurality of venting holes, and a bus bar cover part corresponding to an upper portion of the end plate.

3. The battery module of claim 2, wherein the first part includes a micro-perforated structure.

4. The battery module of claim 2, wherein the first part has a mesh structure.

5. The battery module of claim 1, further comprising:
 a terminal bus bar configured to connect the battery cell stack and an external device,
 wherein the end plate includes a connection opening for exposing the terminal bus bar, and
 wherein the bus bar cover part covers the connection opening.

6. The battery module of claim 5, wherein the bus bar cover part includes a stepped portion for coupling an external bus bar at a location corresponding to the terminal bus bar.

7. The battery module of claim 6, wherein the bus bar cover part further includes an external bus bar cover formed to cover the external bus bar so as to correspond to the stepped portion.

8. The battery module of claim 7, wherein the external bus bar cover is rotatably coupled to the bus bar cover part by a hinge.

9. The battery module of claim 1, wherein the end plate further includes a first through-hole to which a connection member for mounting the battery module to a battery pack is inserted, and wherein the cover further includes a second through-hole corresponding to the first through-hole.

10. A battery pack including the battery module of claim 1.

11. A battery module, comprising:
a battery cell stack in which a plurality of battery cells is stacked;
a module frame comprising sidewalls and a top wall, the top wall including a plurality of venting holes, the battery cell stack accommodated in the module frame;
a cover for covering the module frame, the cover having a top wall and sidewalls extending over the sidewalls of the module frame;
a terminal bus bar configured to connect the battery cell stack and an external device; and
an end plate disposed at a side of the battery cell stack, wherein the end plate includes a connection opening for exposing the terminal bus bar, and
wherein the cover covers the connection opening, and
wherein the cover has a plurality of holes.

12. The battery module of claim 11, wherein the cover includes a stepped portion for coupling an external bus bar at a location corresponding to the terminal bus bar.

13. The battery module of claim 12, wherein the cover further includes an external bus bar cover formed to cover the external bus bar so as to correspond to the stepped portion.

14. The battery module of claim 13, wherein the external bus bar cover is rotatably coupled to the cover by a hinge part.

15. The battery module of claim 11, wherein the cover further includes an external bus bar cover formed to cover the connection opening.

16. The battery module of claim 15, wherein the external bus bar cover is rotatably coupled to the cover by a hinge.

17. The battery module of claim 11, wherein the cover includes a stepped portion for coupling an external bus bar at a location corresponding to the terminal bus bar, the stepped portion being formed by a recess in a side of the cover and extending to a top of the cover, and wherein the cover further includes an external bus bar cover formed to cover the external bus bar so as to correspond to the stepped portion, the cover including a top wall forming an extension of the top of the cover and a side wall forming an extension of the side of the cover.

18. The battery module of claim 1, wherein top wall of the cover covers the top wall of the of the module frame and the side walls of the cover cover the side walls of the module frame.

19. The battery module of claim 1, wherein a size of the plurality of holes in the cover is smaller than a size of the plurality of venting holes.

20. The battery module of claim 1, wherein the cover is on an exterior of the module frame.

\* \* \* \* \*